US010421157B2

(12) United States Patent
Chan et al.

(10) Patent No.: US 10,421,157 B2
(45) Date of Patent: Sep. 24, 2019

(54) METHOD FOR FORMING AN ELECTRODE STRUCTURE FOR A CAPACITIVE TOUCH SENSOR

(71) Applicant: M-SOLV LTD., Oxford, Oxfordshire (GB)

(72) Inventors: Yuk Kwan Chan, Oxford (GB); Camilo Prieto Rio, Oxford (GB)

(73) Assignee: M-SOLV LTD., Oxford (GB)

( * ) Notice: Subject to any disclaimer, the term of this patent is extended or adjusted under 35 U.S.C. 154(b) by 886 days.

(21) Appl. No.: 14/769,412

(22) PCT Filed: Feb. 14, 2014

(86) PCT No.: PCT/GB2014/050440
§ 371 (c)(1),
(2) Date: Aug. 20, 2015

(87) PCT Pub. No.: WO2014/128441
PCT Pub. Date: Aug. 28, 2014

(65) Prior Publication Data
US 2015/0375341 A1    Dec. 31, 2015

(30) Foreign Application Priority Data

Feb. 21, 2013  (GB) .................................. 1303074.7

(51) Int. Cl.
*B23K 26/362*    (2014.01)
*G06F 3/044*    (2006.01)
(Continued)

(52) U.S. Cl.
CPC .......... *B23K 26/362* (2013.01); *B23K 26/361* (2015.10); *B23K 26/402* (2013.01);
(Continued)

(58) Field of Classification Search
CPC ... B23K 26/362; B23K 26/361; B23K 26/402
(Continued)

(56) References Cited

U.S. PATENT DOCUMENTS 6,249,371 B1    6/2001    Masuda et al.
6,706,998 B2    3/2004    Cutler
(Continued)

FOREIGN PATENT DOCUMENTS

CN    201380363 Y    1/2010
CN    201645056 U    11/2010
(Continued)

OTHER PUBLICATIONS

Raciukaitisa G., et al., "Patterning of ITO Layer on Glass with High Repetition Rate Picosecond Lasers" [online] Journal of Laser Micro/Nanoengineering vol. 2, No. 1, 2007.
(Continued)

*Primary Examiner* — Christina A Johnson
*Assistant Examiner* — Xue H Liu
(74) *Attorney, Agent, or Firm* — Harness, Dickey & Pierce, P.L.C.

(57) ABSTRACT

A method of forming an electrode structure for a capacitive touch sensor in a first transparent conductive layer (19) which is located on a first side of a glass substrate (5) on the second side of which is a color filter layer (11,12,13) over-coated with a transparent non-conductive layer (15) and a second transparent conductive layer (7), by a direct write laser scribing process using a pulsed solid state laser (22), the laser wavelength in the range 257 nm to 266 nm and a pulse length in the range 50 fs to 50 ns so grooves (21) are formed in the first transparent conductive layer (19) to electrically isolate areas of the first transparent conductive layer (19) on opposite sides of each groove (21). This selection of wavelength and pulse length enables the
(Continued)

grooves (21) to be formed with substantially no damage to the underlying color filter layer (11, 12, 13), the transparent non-conductive layer (15) or the second transparent conductive layer (7) on the second side of the glass substrate (5).

7 Claims, 4 Drawing Sheets

(51) Int. Cl.
*G06F 3/041* (2006.01)
*B23K 26/402* (2014.01)
*B23K 26/361* (2014.01)
*B23K 103/00* (2006.01)

(52) U.S. Cl.
CPC ............ *G06F 3/044* (2013.01); *G06F 3/0412* (2013.01); *B23K 2103/50* (2018.08); *G06F 2203/04103* (2013.01)

(58) Field of Classification Search
USPC ........................................................ 264/400
See application file for complete search history.

(56) References Cited

U.S. PATENT DOCUMENTS

| | | | |
|---|---|---|---|
| 8,134,527 | B2 | 3/2012 | Chien et al. |
| 8,648,277 | B2 | 2/2014 | Alpay et al. |
| 8,881,388 | B2 | 11/2014 | Milne |
| 2003/0132208 | A1 | 7/2003 | Cutler |
| 2005/0194365 | A1 | 9/2005 | Li |
| 2005/0274702 | A1 | 12/2005 | Deshi |
| 2006/0261924 | A1 | 11/2006 | Swenson et al. |
| 2007/0215581 | A1 | 9/2007 | Kato et al. |
| 2007/0272667 | A1 | 11/2007 | Lei et al. |
| 2009/0322702 | A1 | 12/2009 | Chien et al. |
| 2010/0200539 | A1 | 8/2010 | Yun et al. |
| 2011/0266264 | A1 | 11/2011 | Rumsby |
| 2011/0285641 | A1 | 11/2011 | Huang |
| 2012/0113063 | A1 | 5/2012 | Kim et al. |
| 2012/0169664 | A1 | 7/2012 | Milne |
| 2012/0248075 | A1 | 10/2012 | Alpay et al. |
| 2012/0322240 | A1* | 12/2012 | Holden ............... B23K 26/0635 438/462 |
| 2013/0267076 | A1 | 10/2013 | Lei et al. |

FOREIGN PATENT DOCUMENTS

| | | |
|---|---|---|
| CN | 202736018 U | 2/2013 |
| EP | 2437317 A2 | 4/2012 |
| GB | 2472613 A | 2/2011 |
| GB | 2 487 962 A | 8/2012 |
| GB | 2511064 A | 8/2014 |
| JP | H0833993 A | 2/1996 |
| JP | H11258645 A | 9/1999 |
| JP | 2004344928 A | 12/2004 |
| JP | 2005532908 A | 11/2005 |
| JP | 2006114428 A | 4/2006 |
| JP | 2008091116 A | 4/2008 |
| JP | 2008264854 A | 11/2008 |
| JP | 2009-050868 A | 3/2009 |
| JP | 2012123744 A | 6/2012 |
| JP | 2012174578 A | 9/2012 |
| TW | 201000966 A | 1/2010 |
| TW | 201106240 A | 2/2011 |
| TW | 201142418 A | 12/2011 |
| TW | 201246388 A | 11/2012 |
| TW | 201246448 A | 11/2012 |
| WO | WO-2009114375 A2 | 9/2009 |
| WO | WO-2012107726 A1 | 8/2012 |

OTHER PUBLICATIONS

Second Office Action regarding Chinese Application No. 201480009362.5, dated Mar. 3, 2017. Translation provided by J.A. Kemp.

Office Action regarding Japanese Patent Application No. 2015-558541, dated Oct. 31, 2017. Translation provided by J A Kemp.

Restriction Requirement regarding U.S. Appl. No. 14/769,431, dated Jan. 23, 2018.

Office Action of Taiwan Application No. 103105942, dated May 4, 2017. Translation provided by J.A. Kemp.

Search Report of Taiwan Patent Application No. 103105942, filed Feb. 21, 2014. Translation provided by J.A. Kemp.

\* cited by examiner

METHOD FOR FORMING AN ELECTRODE STRUCTURE FOR A CAPACITIVE TOUCH SENSOR

CROSS-REFERENCE TO RELATED APPLICATIONS

This application is a 371 U.S. National Stage of International Application No. PCT/GB2014/050440, filed Feb. 14, 2014. This application claims the priority of Great Britain Patent Application No. 1303074.7, filed Feb. 21, 2013. The entire disclosures of the above applications are incorporated herein by reference.

FIELD OF THE INVENTION

This invention relates to a method of forming an electrode structure for a capacitive touch sensor and to apparatus for carrying out the method.

BACKGROUND ART

There is a requirement to incorporate capacitive touch sensors into devices such as smart phones, MP3 players, PDAs, tablets, Ultrabook PCs, AIO PCs, etc. Such devices generally have a front transparent cover that is made of glass or plastic onto the rear of which a transparent capacitive sensor is bonded. The capacitive sensor often consists of a substrate made from a transparent material such as plastic or glass on opposite sides of which transparent conductive (TC) materials such as indium tin oxide (ITO) are applied and patterned to form transmit electrode (Tx) and receive electrode (Rx) layers. Alternatively, a single layer sensor can be used which consists of one TC layer applied to the substrate which is suitably patterned and interconnected to form separately addressable Tx and Rx structures.

The cover/touch sensor assembly is attached to the display module which typically consists of a liquid crystal display (LCD). Such an arrangement leads to a cover/sensor/display module that is undesirably thick and heavy. To reduce the thickness and weight it is desirable to form the capacitive touch sensor directly on the cover or integrate the touch sensor into the LCD in some way.

Dual layer sensors that are integrated into LCDs can be of two types: "on-cell" type and "in-cell" type. In the "on-cell" type, the sensor is formed on top of the LCD assembly. In the "in-cell" type, the Tx and Rx layers of the sensor are situated at various places within the LCD structure.

In one case, the Tx and Rx electrodes are formed in TC layers located on opposite sides of the glass substrate which carries the colour filter (CF) assembly and which forms the upper substrate of the LCD. The CF is made of stripes of organic RGB materials deposited within a black matrix (BM) structure and over-coated with an organic planarizing (OP) layer. The TC forming the Tx electrode is deposited on top of the OP layer on the CF and the TC forming the Rx electrode is deposited directly on the rear side of the glass substrate.

In another case, the Tx electrode is buried deeper in the LCD and formed in the TC layer that forms the lower electrode of the LCD in the same plane as the TFTs. In this case, the Rx electrode is formed in a TC layer on one or other of the two sides of the substrate carrying the CF.

For the case where the Tx electrode is situated on the CF substrate and forms the top electrode of the LCD, Tx patterning must be carried out before LCD assembly while patterning of the Rx electrode can take place either before or after LCD assembly. For the case where the Tx electrode is combined with the lower LCD electrode and the Rx electrode is on one or other side of the CF substrate, then this Rx layer can be patterned either before or after LCD assembly.

Hence, for in-cell dual layer sensors it is necessary to form a Tx or Rx electrode pattern in a TC layer situated on top of an organic passivation (OP) layer on top of an RGB CF structure on a glass substrate or to form an Rx electrode in a TC layer on a glass substrate with a CF structure located on the rear side.

In both cases, the usual method to form the electrode structures in the TC layers involves multi-step lithographic processes based on resist exposure and chemical etching of the TC. Such lithographic processes are complex and give rise to defects especially when carried out after the LCD has been assembled. It would be desirable to use laser ablation to form the electrode patterns in the TC layer but if standard laser arrangements are used there is a significant risk that the various layers below the glass substrate on which the TC is provided will be damaged during the laser ablation process.

The present invention thus seeks to provide an improved method which enables laser ablation to be used to form an electrode structure in a TC layer situated on top of a glass substrate without causing significant damage to any of the layers beneath the glass substrate.

SUMMARY OF INVENTION

According to a first aspect of the invention, there is provided a method of forming an electrode structure for a capacitive touch sensor in a first transparent conductive layer located on a first side of a glass substrate on the second side of which is a colour filter layer over-coated with a transparent non-conductive layer and a second transparent conductive layer by a direct write laser scribing process using a pulsed solid state laser, the laser wavelength and pulse length being selected as follows:
  i) a wavelength in the range 257 nm to 266 nm
  ii) a pulse length in the range 50 fs to 50 ns
such that grooves are formed in the first transparent conductive layer to electrically isolate areas of the first transparent conductive layer on opposite sides of each groove with substantially no damage to the colour filter layer, the transparent non-conductive layer or the second transparent conductive layer on the second side of the glass substrate.

According to a second aspect of the invention, there is provided apparatus arranged to carry out a method as described above, the apparatus comprising a pulsed laser source arranged to direct write laser scribe an electrode structure for a capacitive touch sensor in a first transparent conductive layer located on a first side of a glass substrate on the second side of which is a colour filter layer over-coated with a transparent non-conductive layer and a second transparent conductive layer, the laser source being arranged to provide a wavelength and pulse length as follows:
  i) a wavelength in the range 257 nm to 266 nm
  ii) a pulse length in the range 50 fs to 50 ns.

Other preferred and optional features of the invention will be apparent from the following description and the subsidiary claims of the specification.

The term 'glass' as used herein is to be understood to include a material that is sufficiently flat, smooth and impermeable to be used as the substrate for an LCD, for example a plastics material, e.g. as used in some known touch sensor panels. Glass as conventionally used with LCD screens is, however, a preferred material as it absorbs strongly in the deep ultra-violet (DUV) range.

BRIEF DESCRIPTION OF DRAWINGS

The invention will now be further described, merely by way of example, with reference to the accompanying drawings, in which.

DESCRIPTION OF PREFERRED EMBODIMENTS

Figure 1:
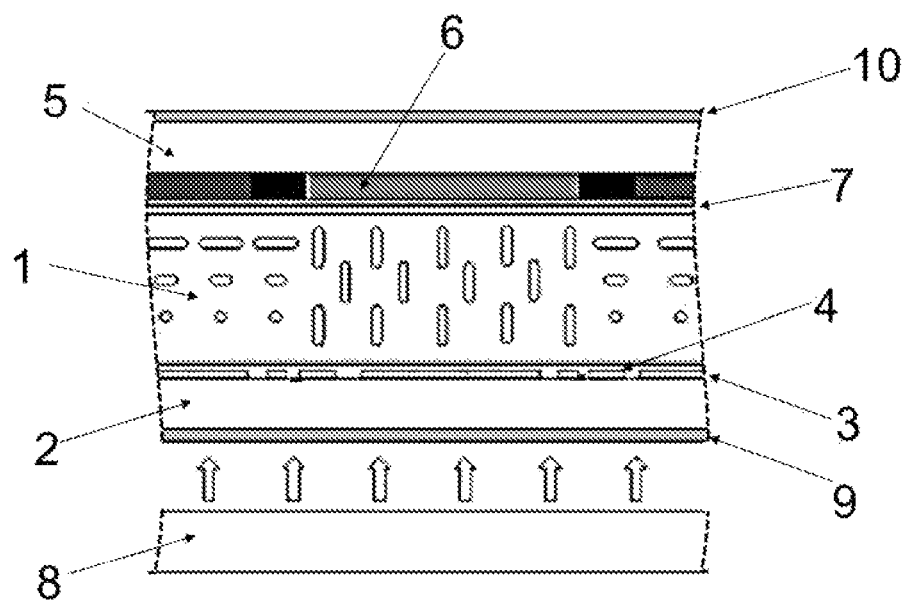
FIG. 1 is a sectional view of a known LCD and CF assembly.

FIG. 1 shows the construction of one type of known LCD/CF module. Liquid crystal material layer 1 is bounded on first (lower) side by a first glass substrate 2 which is coated with TFT devices 3 and first a TC layer 4 and, on second (upper) side, by a second glass substrate 5 coated with a CF layer 6 and second TC layer 7. Backlight unit 8 emits unpolarized light which passes through first polarizer sheet 9 and through all the layers comprising the LCD/CF module to emerge through a second polarizer 10. Several other LCD/CF module structures exist. It is possible for the CF layer to situated before the LCD layer, for example between the first polarizer and the backlight. It is also possible for the LCD structure to be inverted with the TFT layer on the upper side of the LCD with the CF layer situated above or below.

Figure 2:
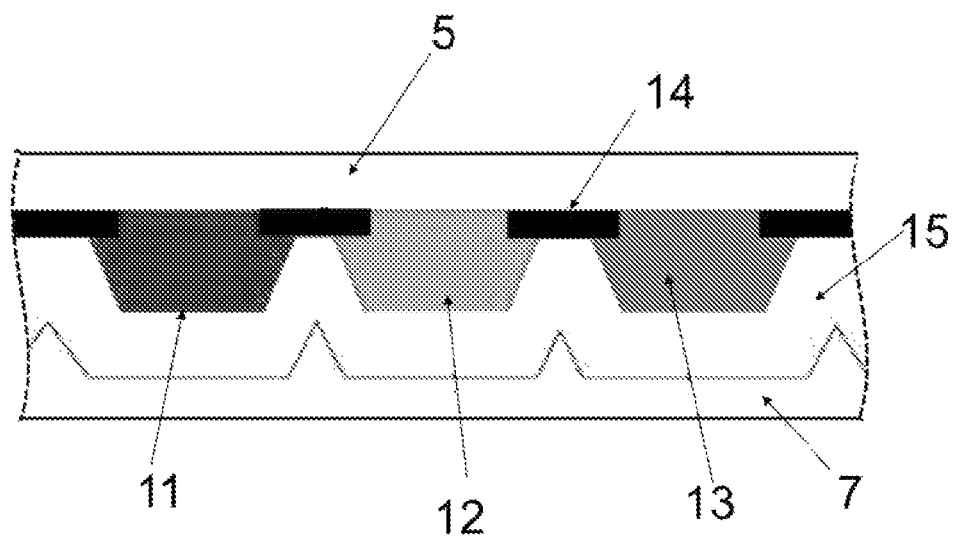
FIG. 2 is a sectional view of a known CF unit.

FIG. 2 shows details of a typical known CF and substrate. Glass substrate 5 has an RGB CF layer formed on a first side thereof. The CF layer consists of alternate stripes 11, 12 and 13 or a two-dimensional array of localized areas of RGB materials corresponding, respectively, to the lines of or individual pixels in an LCD. Stripes of RGB material are separated by areas of black matrix (BM) material 14 to improve viewing contrast. A multi-step lithographic process is typically used to form such RGB and BM structures.

A thin transparent non-conducting organic planarizing (OP) layer 15 is applied to the RGB/BM layer to form a smooth upper surface. Polymethylmethacrylate (PMMA) or acrylic is typically used to form this layer. A TC layer 7 is deposited on top of the organic layer 15.

Figure 3:
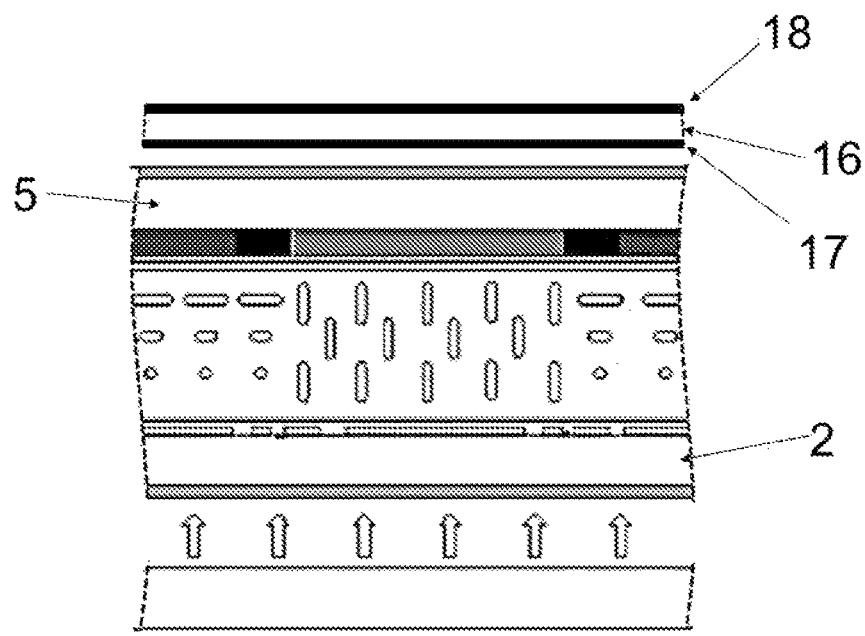
FIG. 3 is a sectional view of a known on-cell type of integrated touch panel/CF/LCD assembly.

FIG. 3 shows the construction of one type of known on-cell capacitive touch sensor module. Glass or transparent plastic substrate 16 has TC layers 17 and 18 deposited on opposite sides thereof. Lower TC layer 17 is patterned to form the sensor Tx layer and upper TC layer 18 is patterned to form the sensor Rx layer. The sensor assembly is then aligned to and attached to the LCD/CF module assembled between glass substrates 2 and 5.

Figure 4:
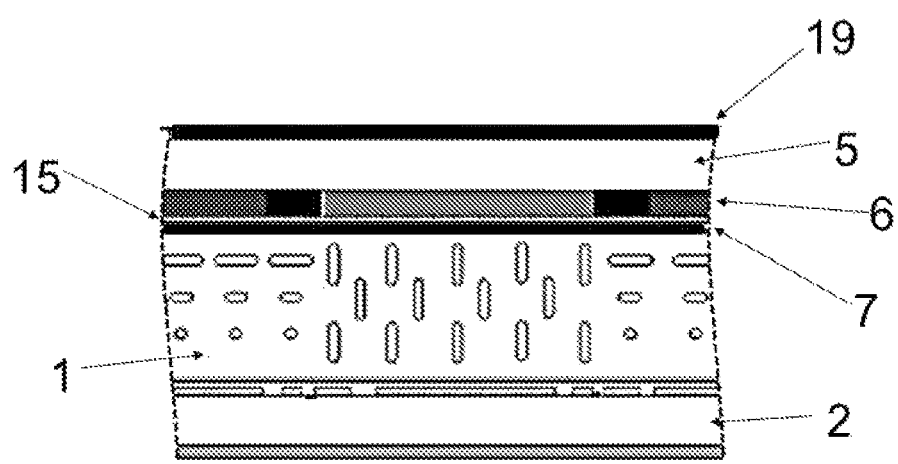
FIG. 4 is a sectional view of a known first type of in-cell integrated touch panel/CF/LCD assembly.

FIG. 4 shows the construction of one type of known in-cell capacitive touch sensor module. A first TC layer 19 is deposited on a first (upper) side of the glass substrate 5 supporting the CF layer and, after suitable patterning, forms the Rx layer. A second TC layer 7 covers an OP layer 15 provided on a CF layer 6 on a second side of the glass substrate 5 and, after suitable patterning, forms the sensor Tx layer. The upper polarizer and backlight unit have been omitted from the figure.

The present invention relates to patterning the Rx layer on the first side of the CF glass substrate in such a device by laser ablation. In the case of this particular in-cell sensor module structure, such Rx layer laser patterning takes place either before or after assembly of the LCD. If Rx layer patterning is performed before LCD assembly then, in a following step, the CF substrate 5 is aligned and attached to the lower LCD substrate 2 and the LCD filled with liquid material 1.

Figure 5:
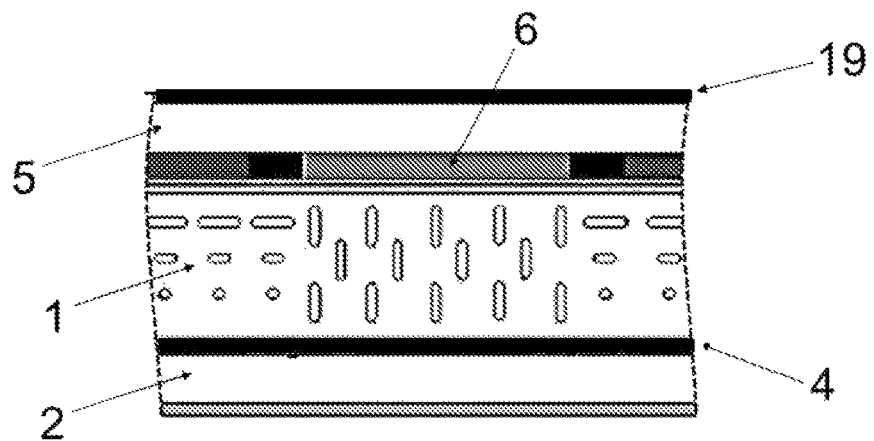
FIG. 5 is a sectional view of a known second type of in-cell integrated touch panel/CF/LCD assembly.

FIG. 5 shows the construction of another type of known in-cell capacitive touch sensor module. In this case, a first TC layer 19 is deposited on a first side of the glass substrate 5 and forms the Rx layer and a second TC layer 4 situated on a second glass substrate 2 supporting the TFTs forms the sensor Tx layer. The upper polarizer and backlight unit have been omitted from the figure.

The present invention also relates to the patterning of the Rx layer on the first (upper) side of the first glass substrate in such a device by laser ablation. In the case of this particular in-cell sensor module structure, such Rx layer laser patterning takes place either before or after assembly of the LCD. If Rx layer patterning is performed before LCD assembly then in a following step CF glass substrate 5 is aligned and attached to the lower LCD substrate 2 and the LCD filled with liquid material 1.

Figure 6:
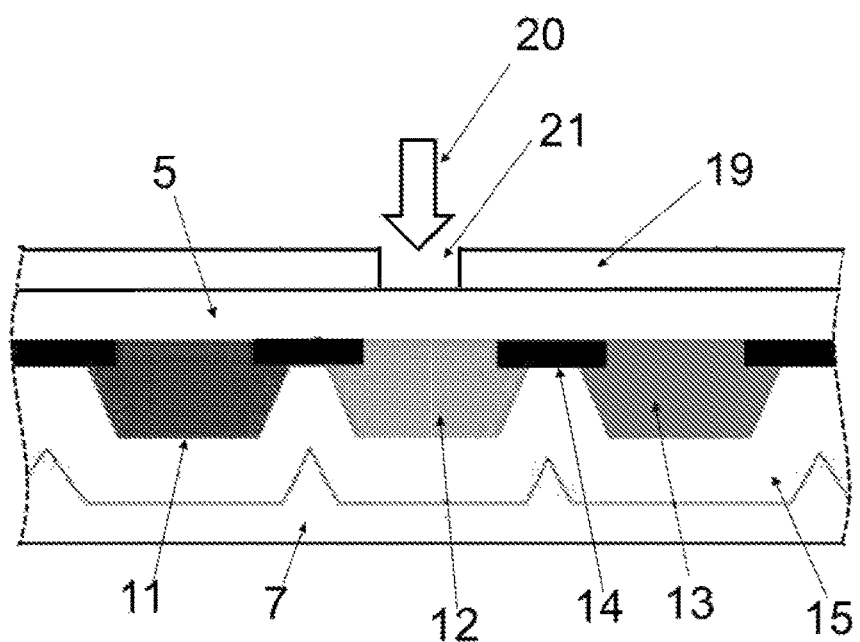
FIG. 6 illustrates formation of a groove for providing an electrode structure in a transparent conductive layer of an in-cell module such as that shown in FIG. 4 or 5 by one embodiment of a method according to a first aspect of the invention.

FIG. 6 illustrates a preferred method according to a first aspect of the invention for forming a pattern in a TC layer 19 on a first (upper) side of a CF glass substrate 5 on the rear of which are layers of RGB/BM, OP and TC materials. A pulsed laser beam 20 irradiates the surface of the TC layer 19 and is moved over the surface so as to remove material therefrom by laser ablation to form a pattern of grooves 21 in the TC layer 19. The laser beam 20 is arranged to remove all TC material in the grooves 21 so that there is no electrical conduction across the groove 21 but to not damage the RGB materials 11, 12 and 13, the BM material 14, the organic layer 15 or the lower TC layer 7 on the rear of the substrate.

The laser used is of pulsed type emitting pulses having a duration less than 50 ns and preferably less than 50 ps. Laser operation is in the deep ultra-violet (DUV) range. Operation in the UV to IR regions (i.e. 351 nm to 1070 nm) is not desirable as the TC layer has minimal absorption and parts of the RGB CF have significant absorption at these wavelengths.

The pulsed laser used may, for example, be selected from one of the following:

A laser operating at 266 nm with a nominal output pulse length of 10 ns

A laser operating at 266 nm with a nominal output pulse length of 15 ps

A laser operating at 263 nm with a nominal output pulse length of 10 ns

A laser operating at 262 nm with a nominal output pulse length of 150 fs

A laser operating at 257.5 nm with a nominal output pulse length of 10 ps.

It is found that UV, visible and IR lasers with a pulse length in the 0.5 ps to 200 ns range are not suitable as damage to the underlying CF materials occurs. However, if a shorter wavelength is used, i.e. 266 nm, 263 nm, 262 nm or 257.5 nm satisfactory results are achievable as the absorption in the TC layer is greater (so providing more protection for the underlying layers).

Shorter pulse lengths are generally preferred as the TC layer and the underlying organic layer can be very thin, e.g. 100 nm or less, so are susceptible to thermal damage. The shorter the pulse length, the shorter the time period in which heat energy from the laser pulse can diffuse into adjacent areas, particularly the underlying layers.

It will be appreciated that the laser wavelength and pulse length are selected such that the laser scribing process forms grooves in the transparent conductive layer that electrically isolate areas of the TC layer on opposite sides of each groove and that this needs to be done with substantially no damage to the transparent non-conductive layer or the colour filter layer on the rear side of the glass substrate. By this means, a series of grooves can be formed in the TC layer to form an electrode structure therein. The grooves typically have a width in the range 5 to 30 µm though wider grooves are also possible.

The invention is thus directed towards the formation of an electrode structure in a transparent conductive (TC) layer provided on a glass substrate by direct laser scribing where there is a danger of causing thermal damage to non-conductive layer underlying the glass substrate and/or to a colour filter layer underlying the glass substrate and/or to a second TC layer underlying the glass substrate.

This danger arises when there is only a small difference between the pulse energy density required to ablate the first TC layer and that which is likely to damage the layers underlying the glass substrate. The type of laser, wavelength and pulse length specified above are used to avoid this problem. In situations in which this process 'window' is very small, it is also possible to provide the laser beam with a top-hat profile to reduce further the risk heat damage to the underlying layers. However, as the glass substrate absorbs some of the energy of the laser beam, this is not generally required.

Figure 7:
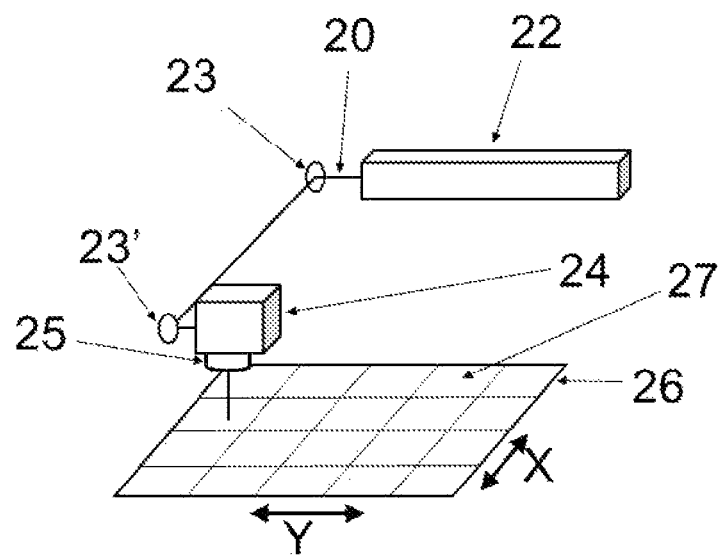
FIG. 7 is a schematic perspective view of a preferred embodiment of apparatus according to the second aspect of the invention for carrying out the method illustrated in FIG. 6.

FIG. 7 shows a schematic perspective view of one form of apparatus arranged to carry out the laser patterning process described above. Laser 22 emits laser beam 20 which is directed via mirrors 23, 23' to a two-dimensional scanner unit 24. The beam exiting the scanner is focussed by an f-theta lens 25 onto the surface of a glass substrate 26 which is mounted on stages such that it can be moved in directions X and Y. The glass substrate 26 has a TC on the upper side and is coated with an RGB CF layer, an organic layer and a top TC layer (as described above) on the rear side. With the substrate 26 stationary, the scanner 24 moves the beam over sub-areas 27 of the substrate 26 forming isolating grooves in the TC layer required to form the touch sensor electrode structure. After completion of each sub area 27, the substrate 26 is stepped to a new sub area 27 and the process repeated. This "step and scan" process is repeated until all of the glass substrate 26 has been patterned. Sub areas 27 can correspond to complete touch sensors for small devices (such as smart phones) or may form only part of larger touch sensors for larger devices (such as tablets and PCs). In the latter case, the sub-areas need to be 'stitched' together to form the electrode structure of the touch sensor.

Operation of the apparatus is preferably under the control of control means, such as a computer, which is arranged to control the laser and movement of the laser to carry out the scanning processes described.

The capacitive touch sensor laser patterning process described above can be performed on substrates which each contain one or more CF devices that are subsequently aligned to and attached to other substrates to form complete LCDs or, alternatively, the laser patterning can be performed on CF substrates already assembled to LCDs. Laser patterning individual parts either before or after assembly into complete LCD modules is also possible.

Key aspects of the process described above are:
1) Forming a pattern in a first TC layer on a first side of a glass substrate on the second (rear) side of which is an RGB/BM colour filter layer over-coated with a transparent organic layer and second TC layer
2) The pattern forms the Rx electrodes for a two layer capacitive touch sensor
3) The first TC layer is patterned to form the sensor electrode structure by direct write laser ablative scribing of narrow grooves
4) The laser scribing process removes the TC material completely in the grooves but causes no (or minimal) damage to the RGB, BM, organic and/or second TC layer on the rear of the glass substrate
5) The laser is of pulsed type operating in the DUV range and emitting pulses with duration less than 50 ns, and preferably less than 50 ps.

Such a process differs from known processes for forming electrode structures of a touch sensor. In particular, laser scribing has significant advantages over known lithographic methods. It is much more efficient: it can be carried out more quickly, it has a much better yield than a lithographic process and it can be adapted more easily. The above process thus provides considerable advantage over known lithographic methods for forming the electrode structures of an in-cell touch sensor.

The invention claimed is:

1. A method of forming an electrode structure for a capacitive touch sensor, wherein the capacitive touch sensor includes a first transparent conductive layer that is located on a first side of a glass substrate, and a second side of the glass substrate includes a color filter layer over-coated with a transparent non-conductive layer and a second transparent conductive layer, the method comprising:
   generating, using a pulsed solid state laser, a laser beam, wherein:
      the laser beam has a wavelength in a first range of 257 nm to 266 nm; and
      the laser beam has a pulse length in a second range of 50 fs to 50 ns; and
   while (i) the first transparent conductive layer is located on the first side of the glass substrate and (ii) the color filter layer and the second transparent conductive layer are located on the second side of the glass substrate, forming, using the laser beam, a pattern in the first transparent conductive layer, wherein:
      the pattern includes a plurality of grooves;
      for each groove of the plurality of grooves, a first side of the groove is electrically isolated from a second side of the groove; and
      the laser beam is configured to, while forming the pattern, produce substantially no damage to the color filter layer, the transparent non-conductive layer, and the second transparent conductive layer.

2. The method according to claim 1, wherein the pulse length is 50 ps or less.

3. The method according to claim 1, wherein the wavelength is one of 257.5 nm and 266 nm.

4. The method according to claim 1, wherein:
the first transparent conductive layer includes a receive electrode structure; and
the second side of the glass substrate includes a transmit electrode structure.

5. The method according to claim 1, wherein:
the transparent non-conductive layer forms a planarizing layer over the color filter layer; and
the second transparent conductive layer is provided over the planarizing layer.

6. The method according to claim 1, further comprising:
positioning a transparent cover above the capacitive touch sensor; and
positioning a display module below the capacitive touch sensor.

7. The method according to claim 1, further comprising:
scanning the laser beam over a first sub-area of a plurality of sub-areas of the first transparent conductive layer;
stepping the laser beam to a second sub-area of the plurality of sub-areas of the first transparent conductive layer; and
scanning the laser beam over the second sub-area of the plurality of sub-areas of the first transparent conductive layer.

\* \* \* \* \*